United States Patent
Monte

(10) Patent No.: US 7,503,353 B2
(45) Date of Patent: Mar. 17, 2009

(54) METHOD FOR STATISTIC WEIGHING OF A PRODUCT INTRODUCED INTO CONTAINERS IN A FILLING MACHINE

(75) Inventor: Giuseppe Monte, Bologna (IT)

(73) Assignee: Marchesini Group S.p.A., Pianoro (Bologna) ITX (*) Notice: Subject to any disclaimer, the term of this patent is extended or adjusted under 35 U.S.C. 154(b) by 463 days.

(21) Appl. No.: 11/248,445

(22) Filed: Oct. 11, 2005

(65) Prior Publication Data

US 2006/0076078 A1    Apr. 13, 2006

(30) Foreign Application Priority Data

Oct. 13, 2004   (IT)   .......................... BO2004A0625

(51) Int. Cl.
  B65B 1/46       (2006.01)
  B65B 3/28       (2006.01)
  B65B 57/02      (2006.01)
  G01G 15/00      (2006.01)
  G01G 13/00      (2006.01)

(52) U.S. Cl. ............................ 141/1; 141/83; 141/140; 141/168; 177/1; 177/52

(58) Field of Classification Search .................. 141/2, 141/5, 83, 129, 135, 138, 140, 168, 243, 141/1; 117/1, 52–57
See application file for complete search history.

(56) References Cited

U.S. PATENT DOCUMENTS

| | | | |
|---|---|---|---|
| 3,557,889 A | 1/1971 | Rejsa | |
| 5,285,825 A | 2/1994 | Townsley | |
| 5,287,896 A | 2/1994 | Graffin | |
| 5,769,136 A * | 6/1998 | Kanematsu et al. | 141/129 |
| 5,806,287 A | 9/1998 | Trechsel | |
| 5,819,816 A * | 10/1998 | Mayer | 141/83 |
| 5,823,234 A * | 10/1998 | Boertz | 141/67 |
| 6,397,905 B1 * | 6/2002 | Mayer et al. | 141/192 |
| 6,418,701 B1 * | 7/2002 | Navarro | 53/415 |
| 6,800,818 B2 * | 10/2004 | Balboni et al. | 177/52 |
| 7,158,916 B1 * | 1/2007 | Yarian | 702/173 |
| 2003/0062095 A1 * | 4/2003 | Berghoff et al. | 141/198 |
| 2003/0070724 A1 * | 4/2003 | Shock | 141/83 |
| 2003/0102169 A1 * | 6/2003 | Balboni et al. | 177/145 |

FOREIGN PATENT DOCUMENTS

GB   1104301   2/1968

* cited by examiner

Primary Examiner—Timothy L Maust
Assistant Examiner—Nicolas A Arnett
(74) Attorney, Agent, or Firm—William J. Sapone; Coleman Sudol Sapone P.C.

(57) ABSTRACT

According to a method for statistical weighing of a product supplied by a plurality of nozzles into containers, an empty container, belonging to a withdrawing group, is withdrawn to define an empty seat in the withdrawing group. The withdrawn empty container is weighed by a scale, to determine a tare weight, and then introduced in an empty seat made in a test group of containers, is a position designed to match with a selected nozzle to be tested. After introducing product into the weighed, empty container, by the selected nozzle, the filled container is withdrawn and weighed by the same scale to determine a gross weight. The exact quantity of product introduced into the filled container is thus determined by difference between the tare and gross weights.

20 Claims, 12 Drawing Sheets

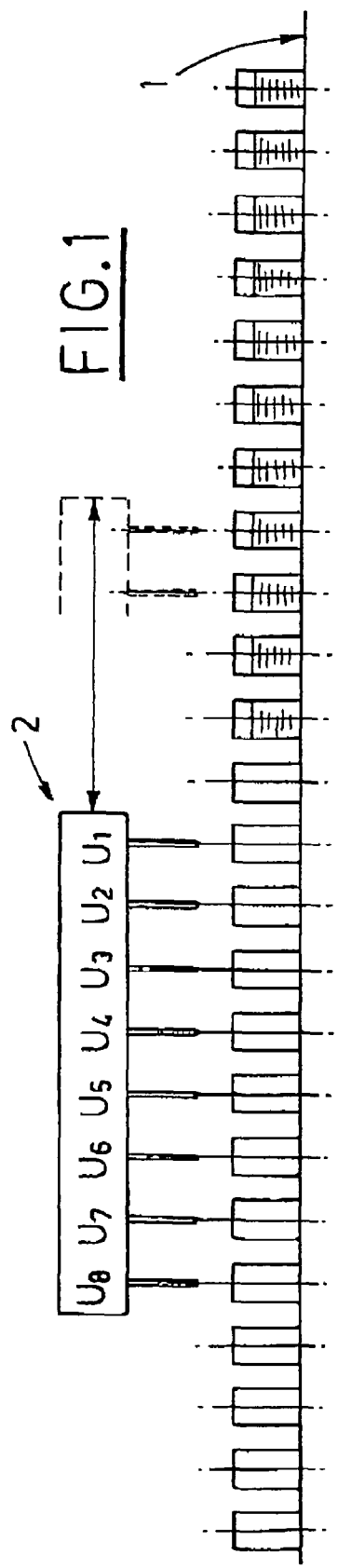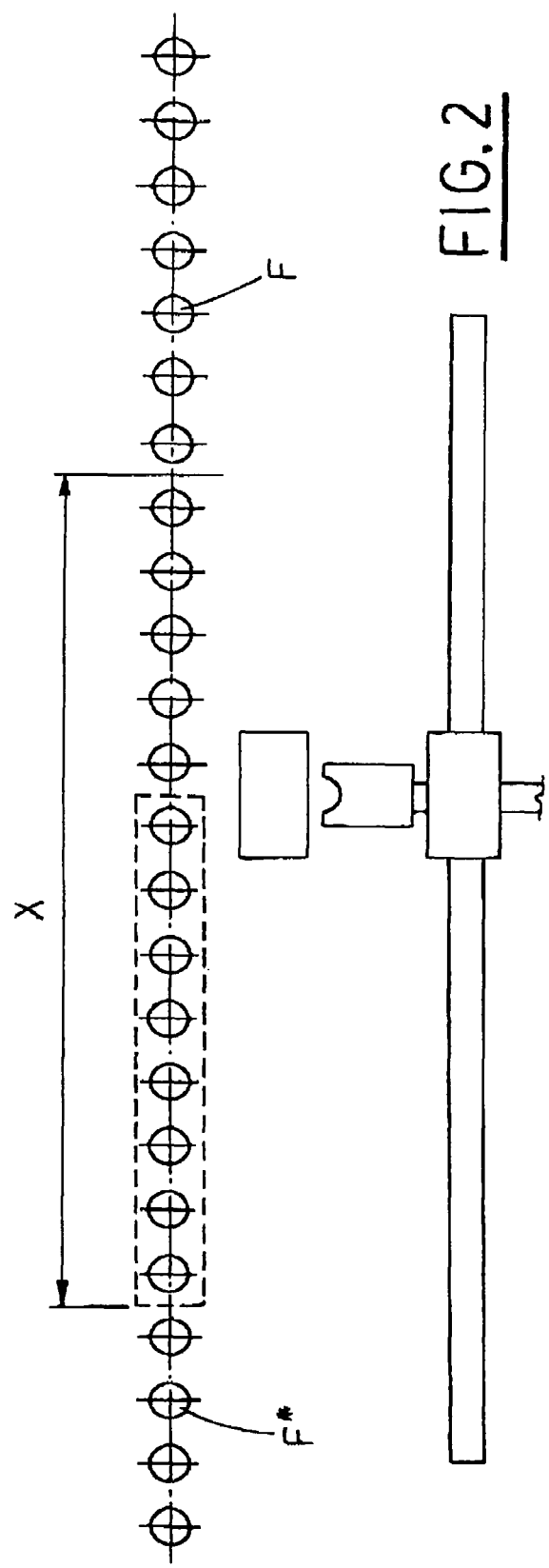

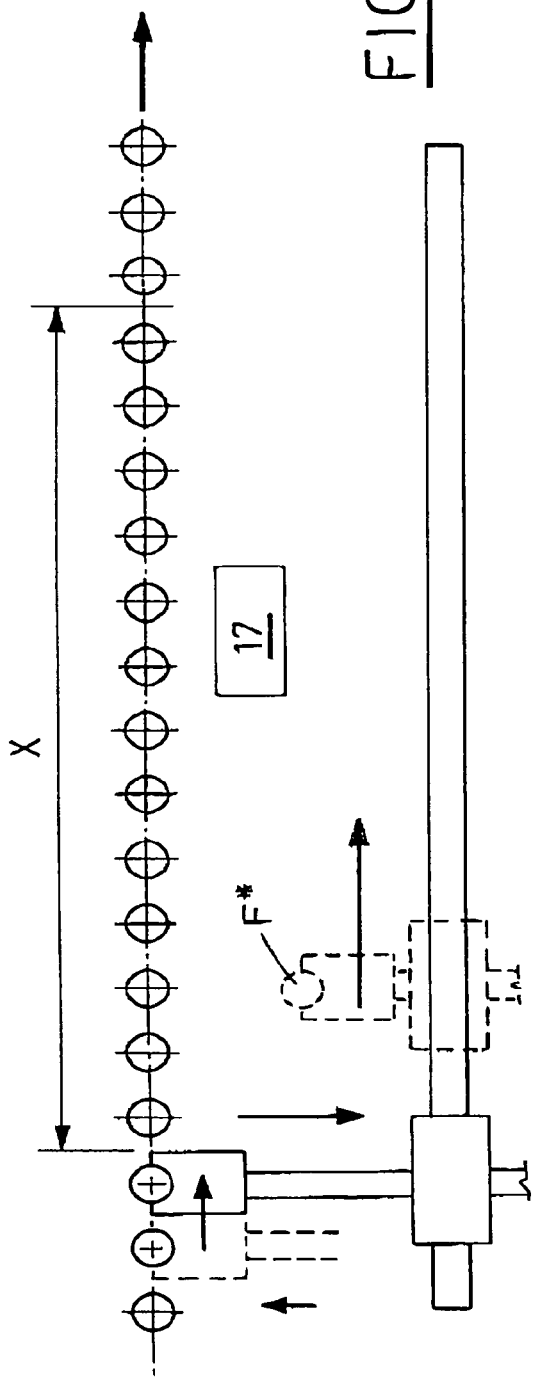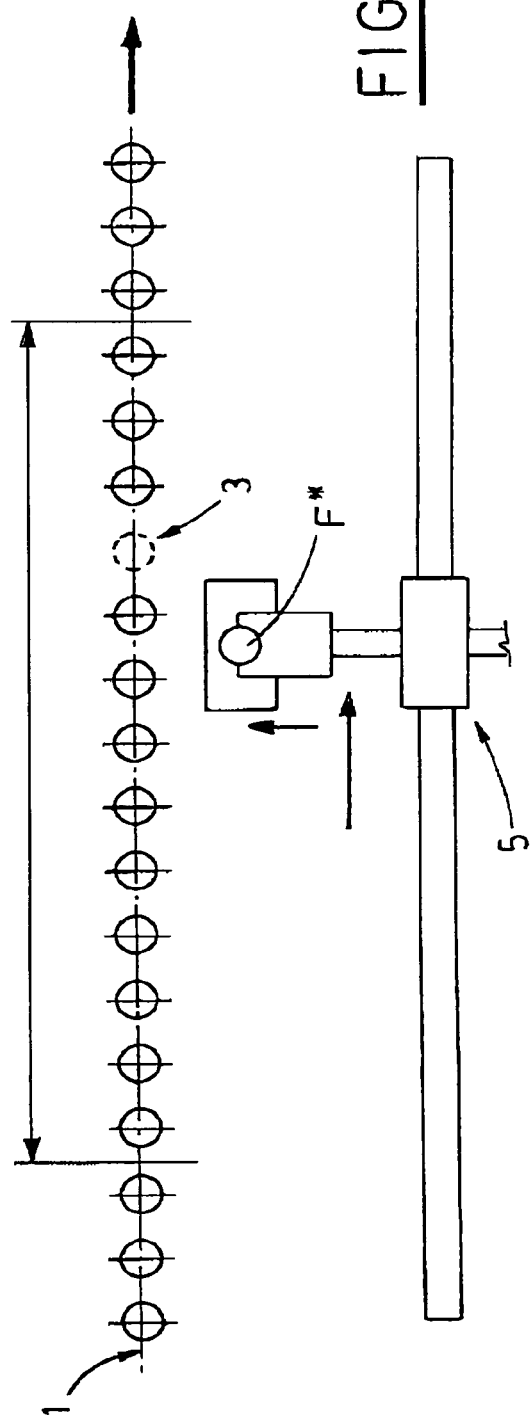
FIG. 3
FIG. 4

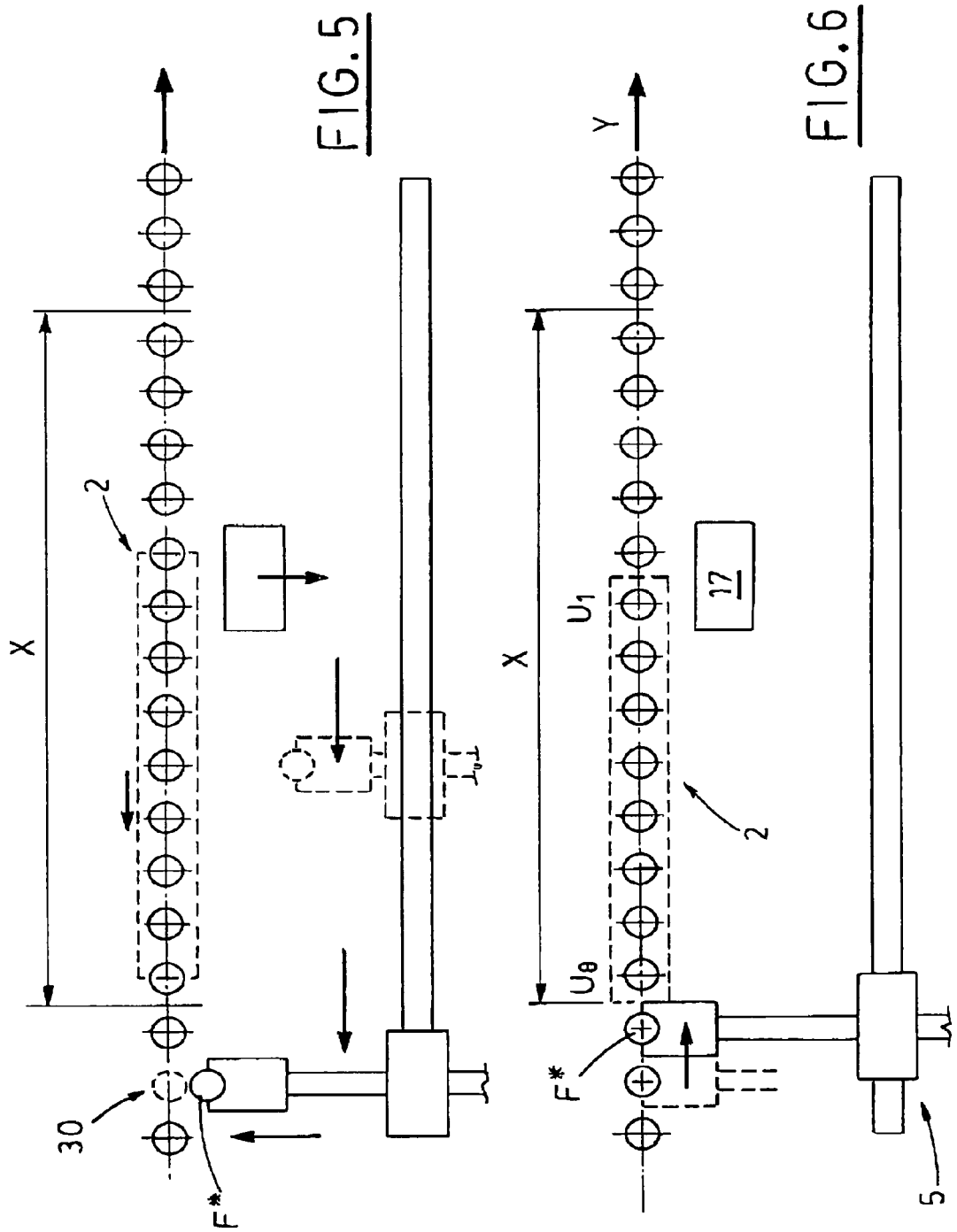

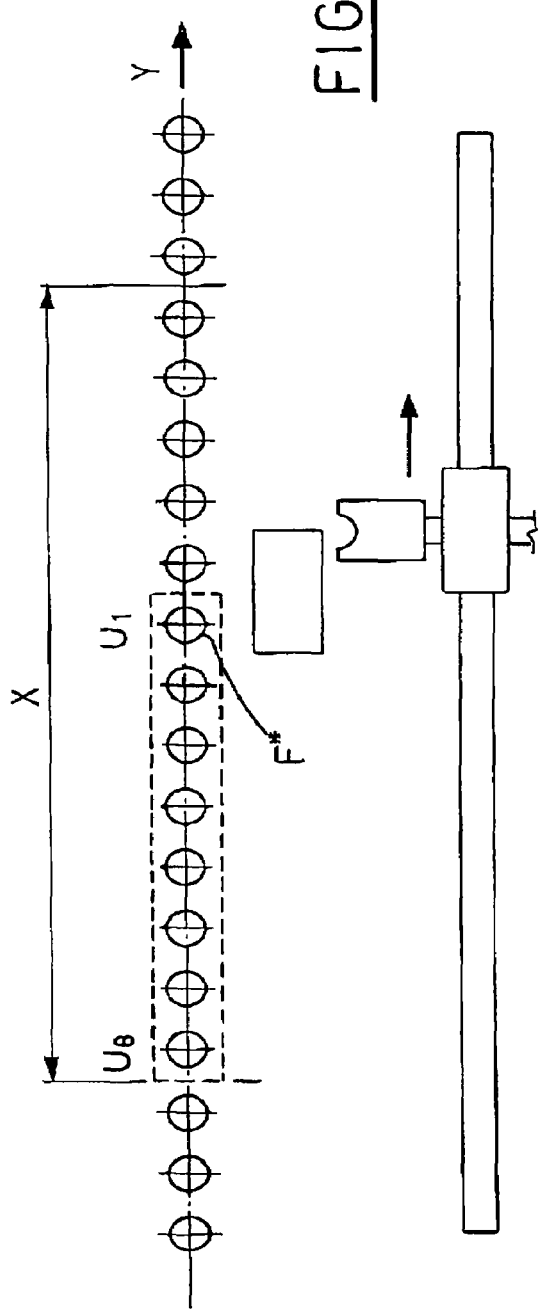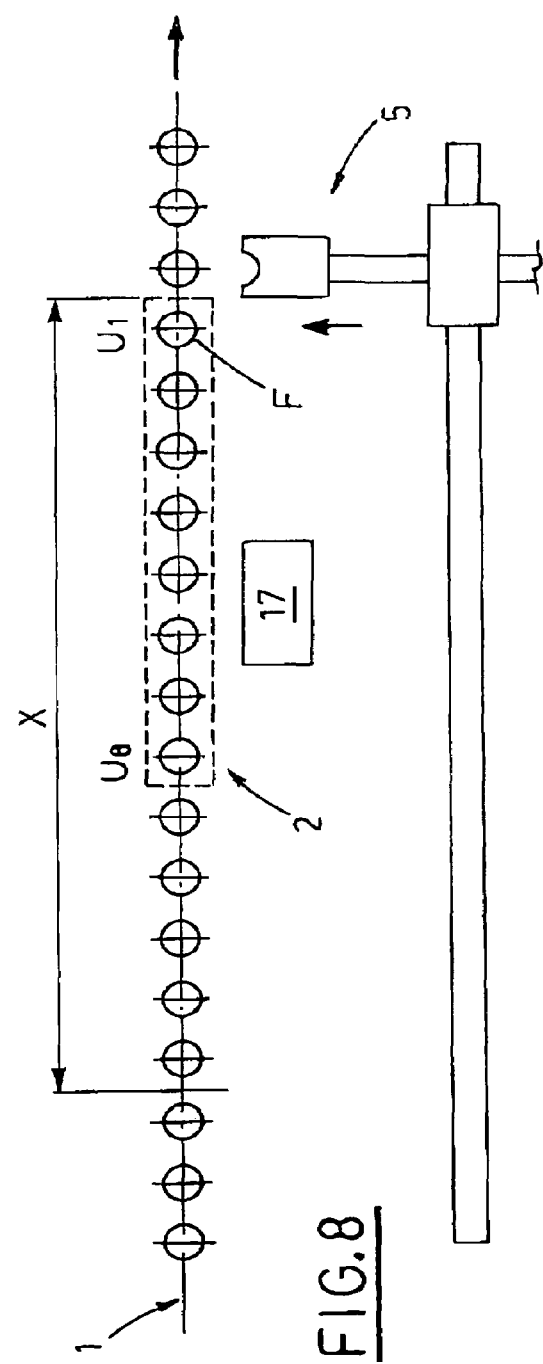

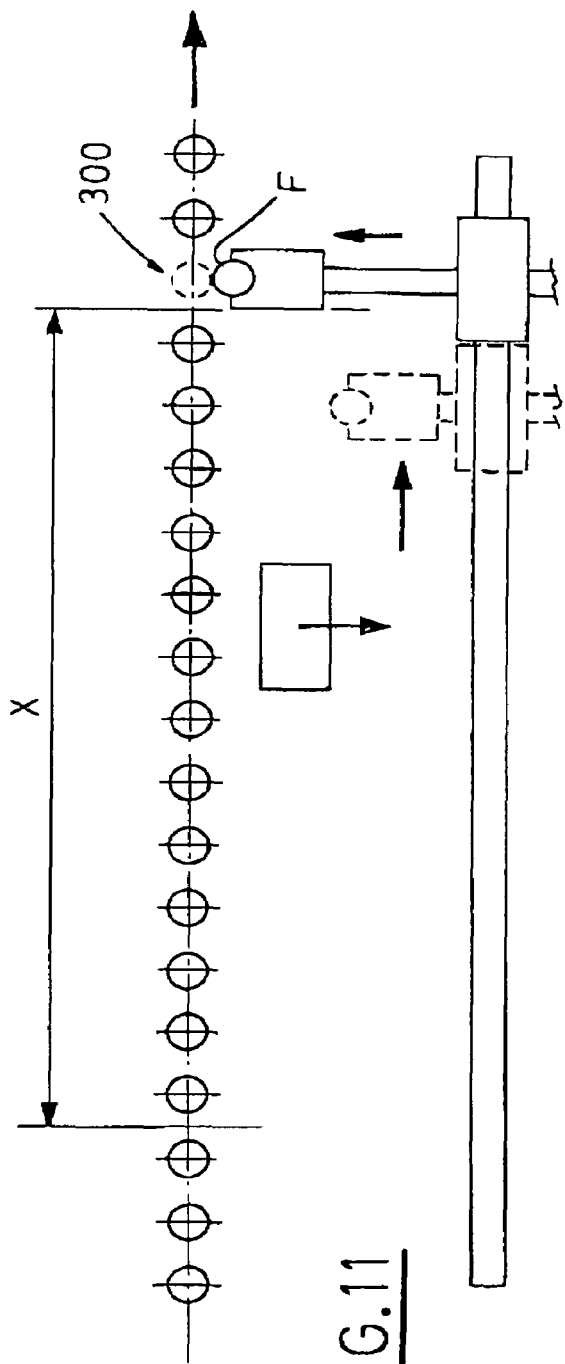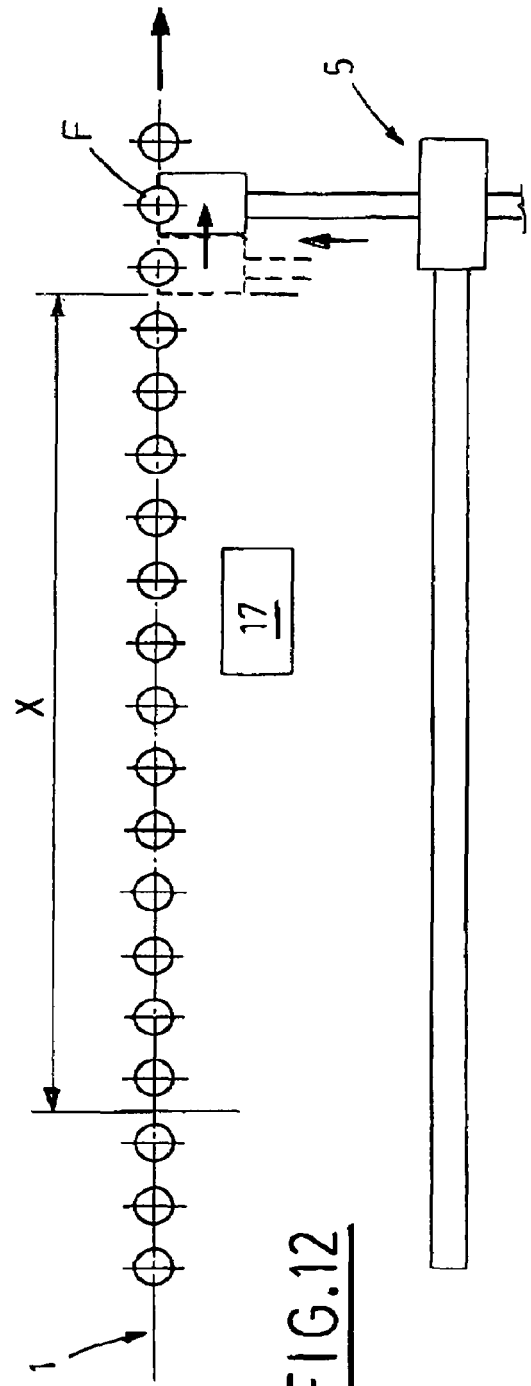

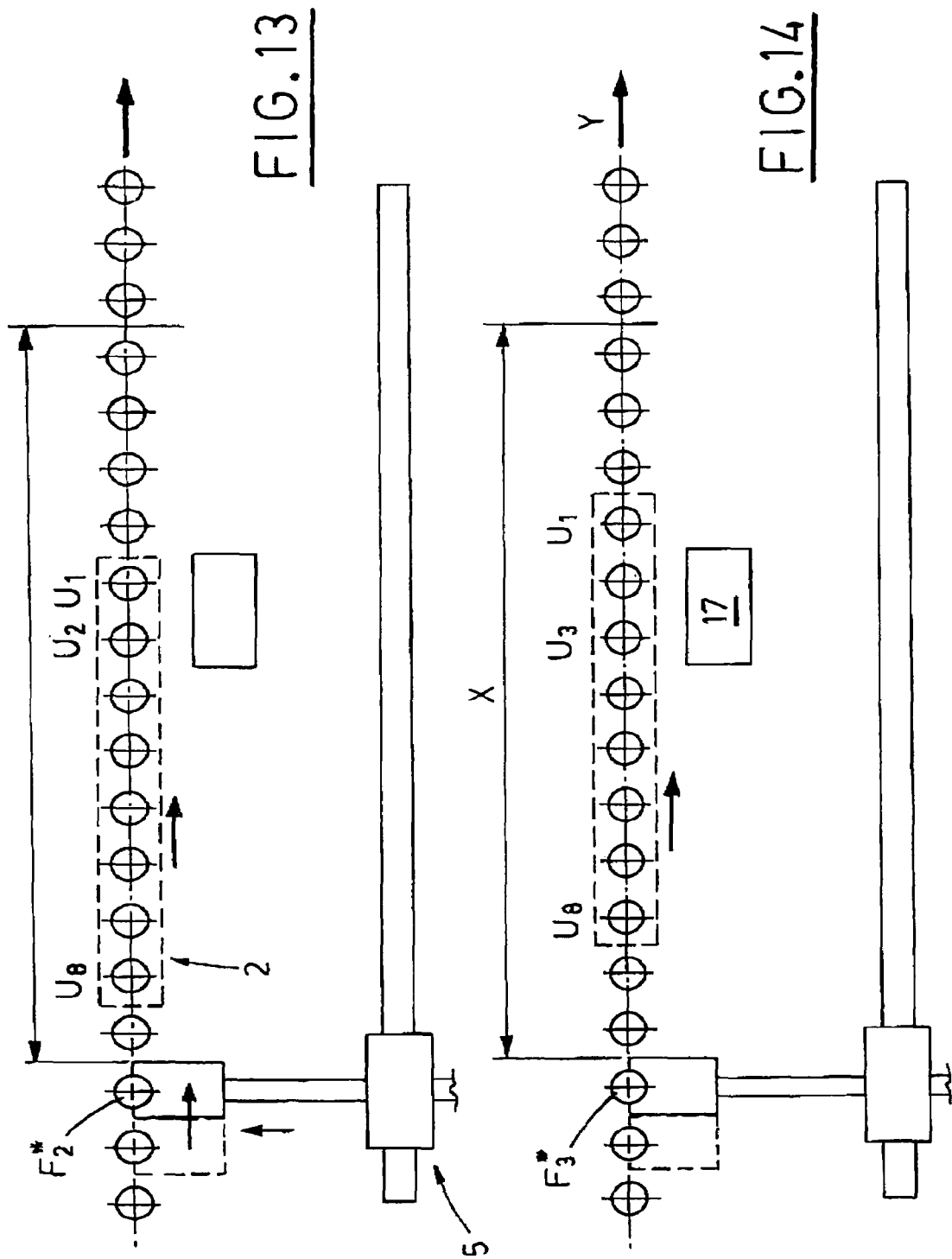

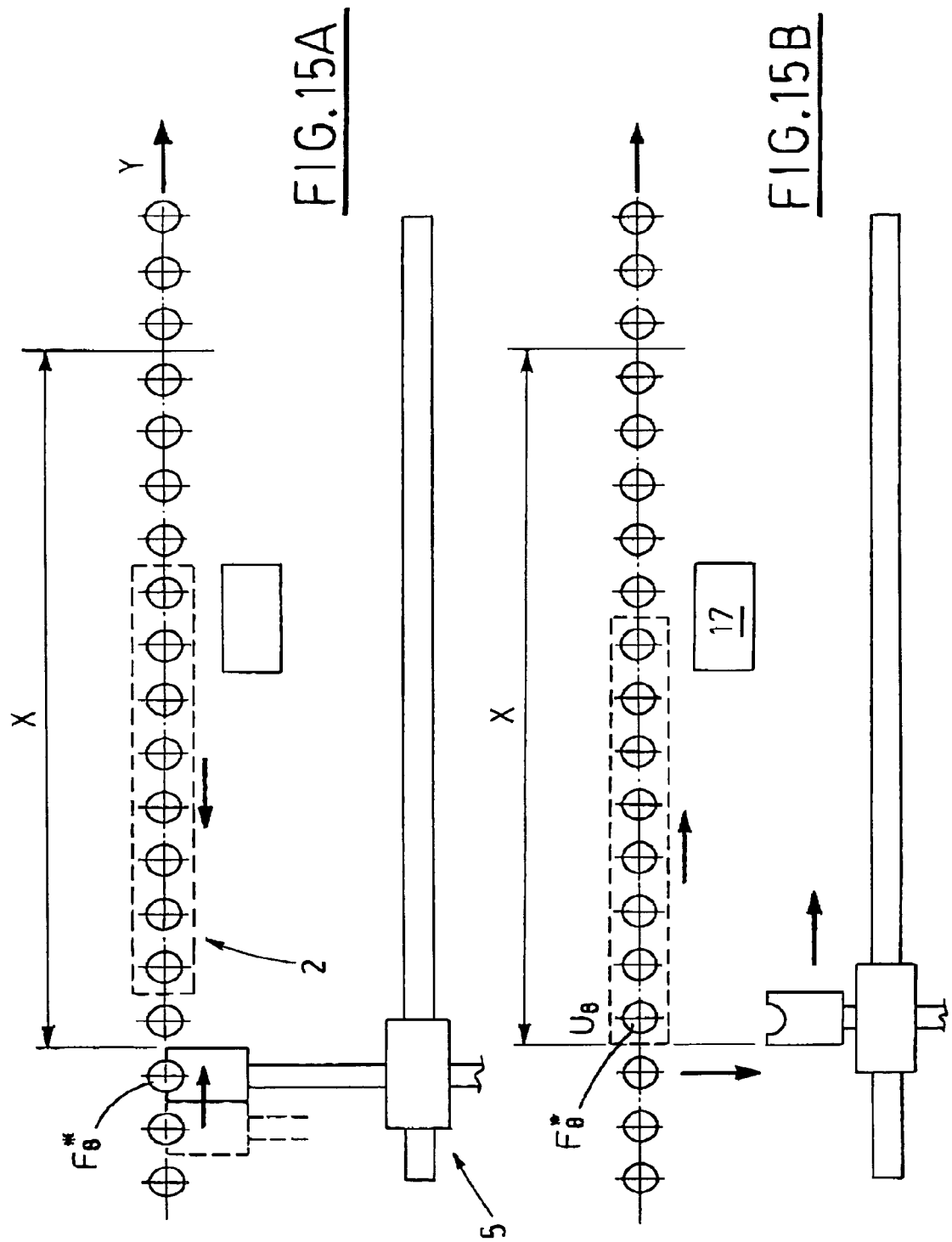

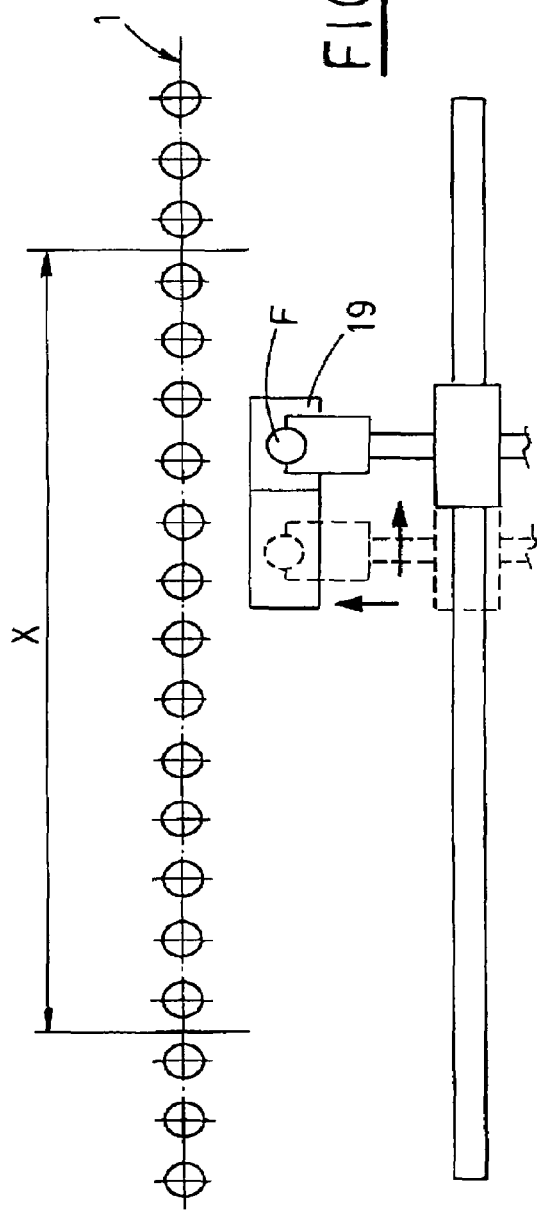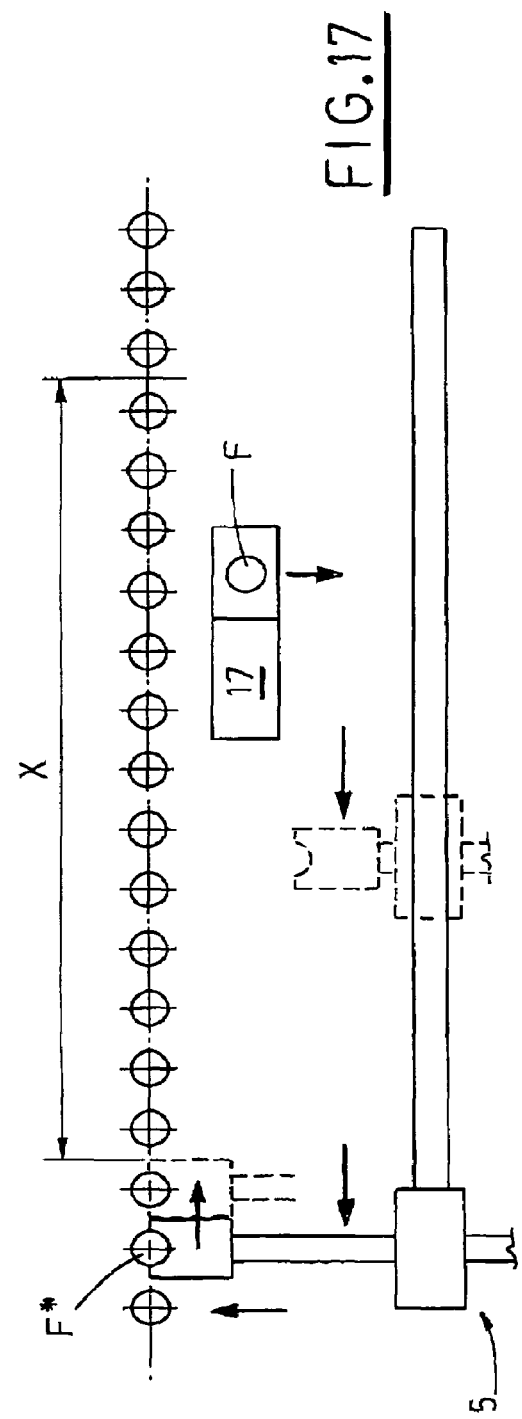

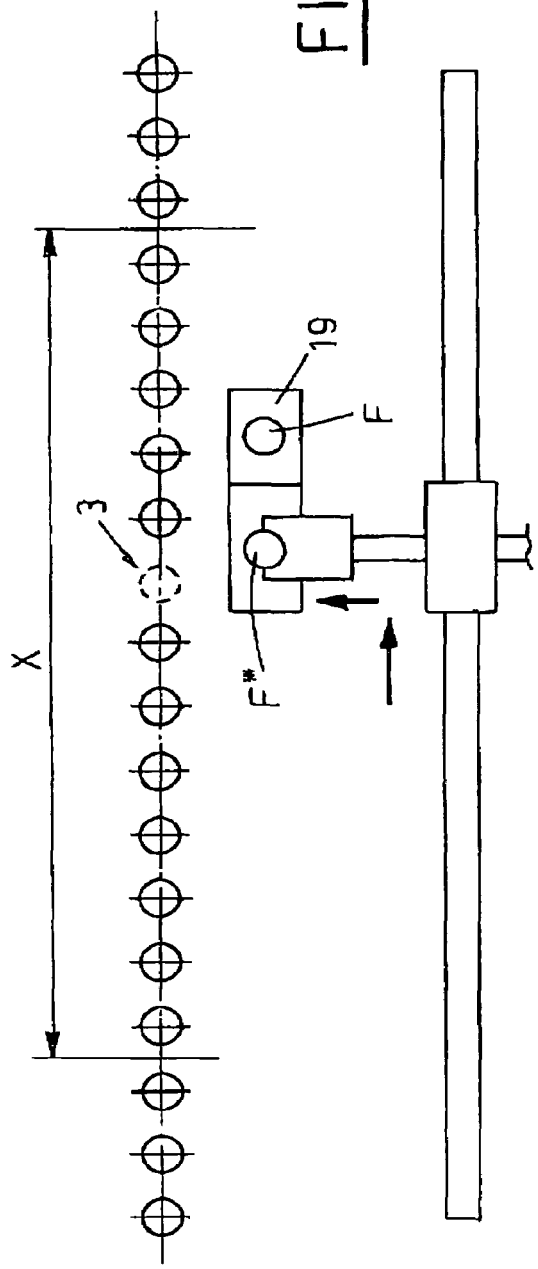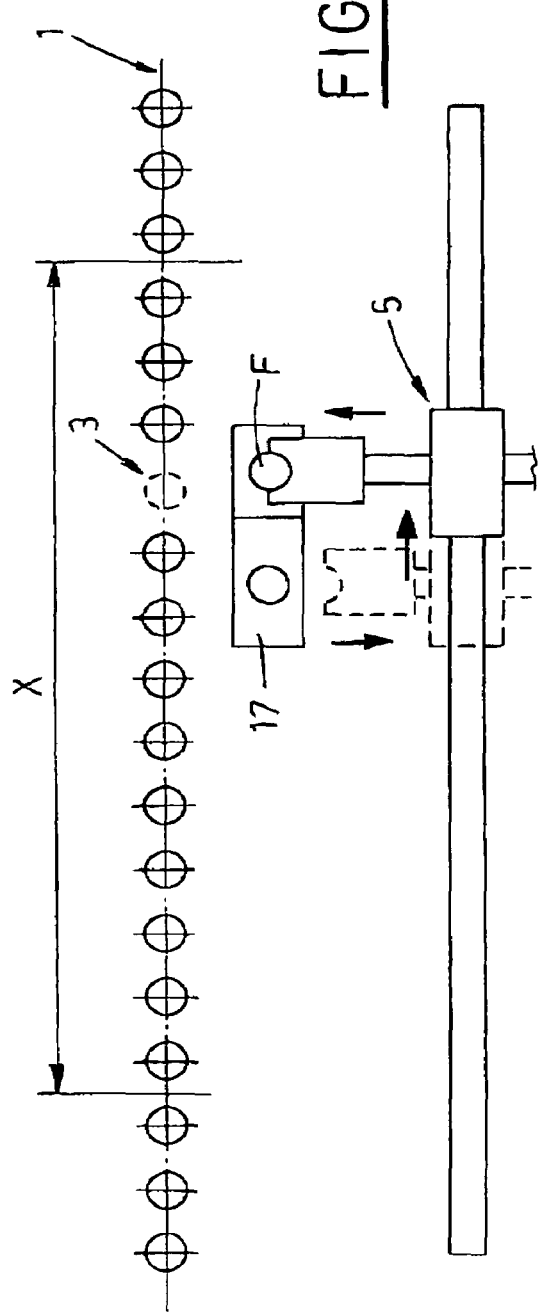

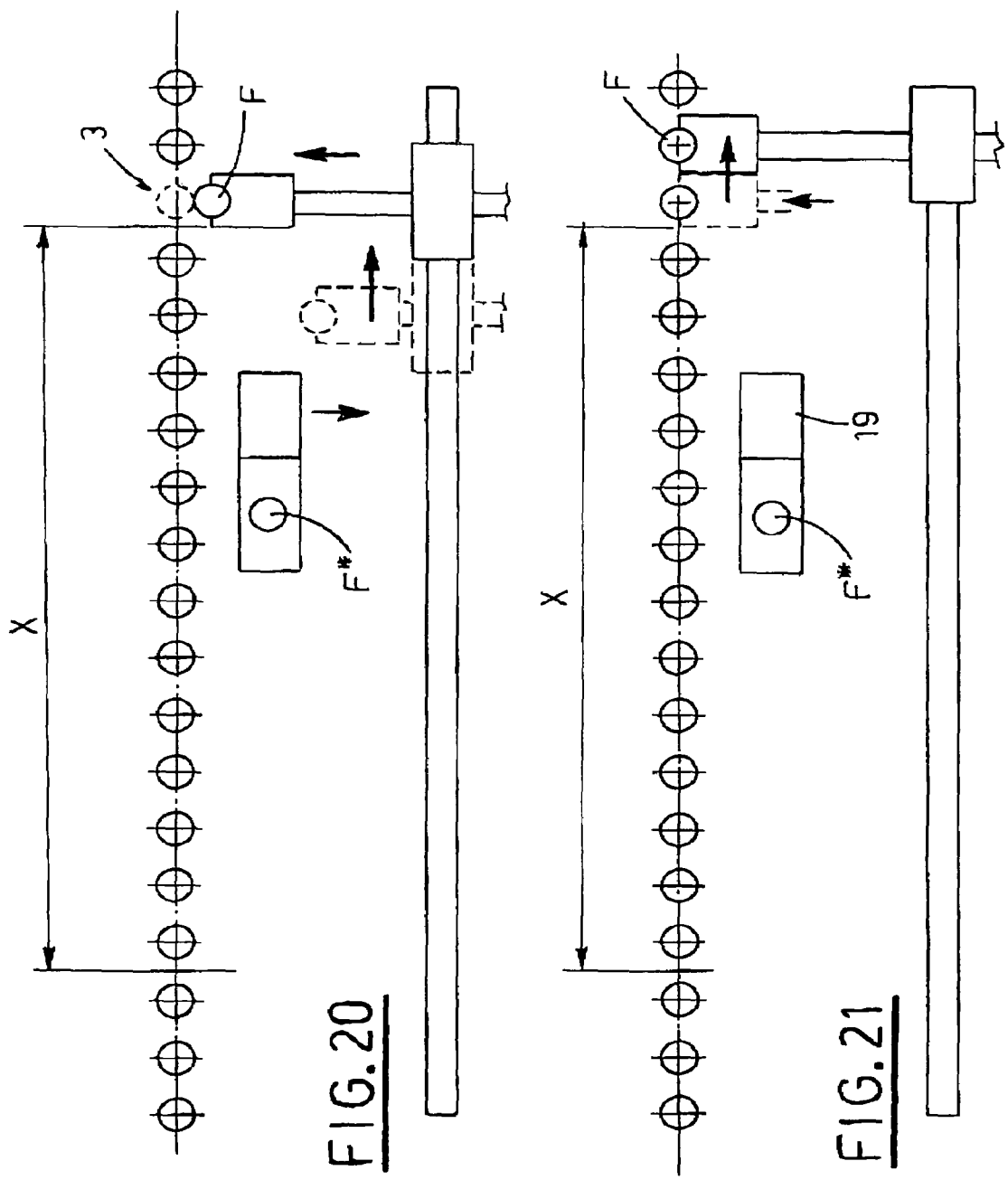

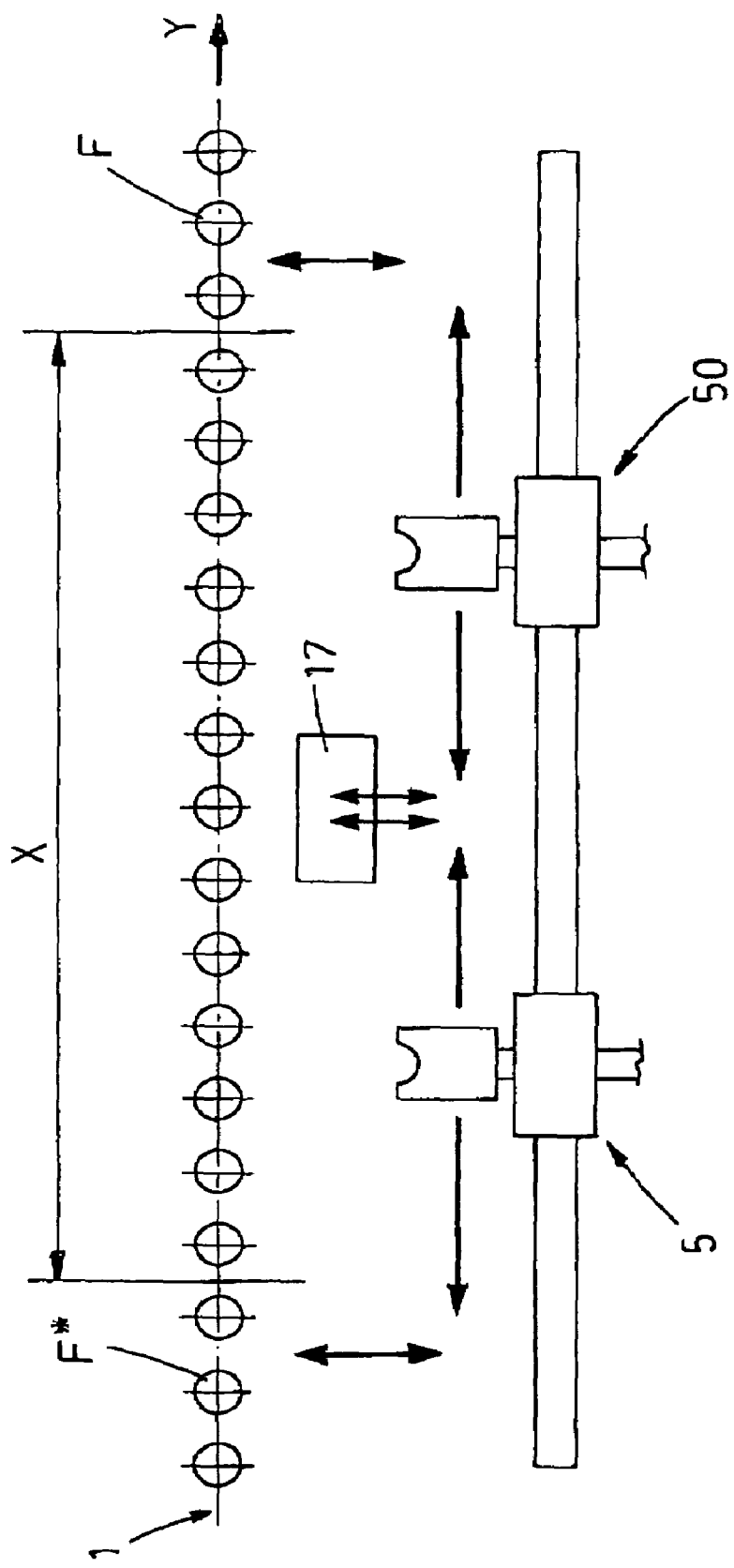

US 7,503,353 B2

METHOD FOR STATISTIC WEIGHING OF A PRODUCT INTRODUCED INTO CONTAINERS IN A FILLING MACHINE

FIELD OF THE INVENTION

The present invention relates to filling containers, such as bottles and the like, with a liquid or powder product.

More in particular, the invention relates to a method for statistical weighing of the product introduced into the containers, in a filling machine.

DESCRITPION OF THE PRIOR ART

There are known machines, which provide for filling with a product bottles conveyed along a stepwise or continuously operated feeding line, and for subsequently capping the bottles.

These machines typically operates with sterile environments, crossed by laminar air flows, and must be entirely washable, sterilizable and designed for sanification.

During batching of the product, a plurality of batching elements can be used, e.g. syringe devices provided with valves (made of ceramic or steel), the number of which depends on the requested productivity, and whose batching precision can reach 0.5% by volume of the product to batch.

These machines have a robotized system for a verify of the delivery of each batching nozzle, verify that is performed at prefixed time intervals.

Thus, by verifying separately each batching element, it is possible to act on the dosage parameters from the control panel, in relation to the indications coming form the robotized verifying system.

The verifying system includes a plurality of mechanical gripping means, which withdraw and/or reposition the bottles from/onto the feeding line, and a plurality of measuring scales, which weigh the bottles either empty and/or filled with product.

Each batching element perform, at prefixed time intervals, the following operation steps:
  withdrawing an empty bottle from the feeding line by one of the gripping means;
  weighing the empty bottle on one of the scales, in order to define its tare;
  repositioning the weighed bottle on the feeding line;
  filling the weighed bottle, performed by the batching element to be tested;
  withdrawing the filled bottle from the feeding line by one of the gripping means;
  weighing the filled bottle on one of the scales, in order to define its gross weight;
  repositioning the weighed filled bottle on the feeding line.

In this way, it is possible to find out the quantity of product delivered by each batching element by simply subtracting the tare from gross weight for any bottle present on the feeding line, filled with the batching element to be tested. However, the tare and the gross weight are not determined by means of the same scale.

This operation mode has some disadvantages.

Actually, the presence of a plurality of mechanical gripping means and of a plurality of measuring scales causes high handling and maintenance costs for both.

Moreover, the precision of each measuring scale must be made uniform by particularly sophisticated and elaborate electronic handling systems, to assure the reliability of the quantities found out by the difference between the gross weights and the corresponding tares.

SUMMARY OF THE INVENTION

The object of the present invention is to avoid the above mentioned disadvantages by proposing a method for statistical weighing the product introduced into containers, in a filling machine, which allows a reduction of the handling, installation and maintenance costs, and which, at the same time, allows high weighing precision to be obtained.

Another object of the present invention is to propose a method for statistical weighing, characterized by particularly rapid and intuitive operation steps, which assure high functionality and reliability standards in any operation step of the filling machine.

The above mentioned objects are obtained, in accordance with the contents of the claims, by a method for statistical weighing of a product introduced into containers in a filling line of a filling machine, with said filling line moving in a forward direction and receiving said containers in seats; said product being supplied by delivery means consisting of a plurality of nozzles, matching with the apertures of groups of containers, in a working area of said filling line;

the method including the following operation steps:
  A) withdrawing an empty container, belonging to a first withdrawing group, from the filling line, to define an empty seat in said first withdrawing group;
  B) weighing said withdrawn empty container, by means of a scale, in order to find out a tare weight of said empty container;
  C) introducing the weighed empty container into said filling line, in an empty seat, made in a first test group of containers and designed to match with a selected nozzle to be tested, in said working area;
  D) introducing product into the weighed empty container, by means of said selected nozzle, up to a pre-established filling level;
  E) withdrawing the filled container from said filling line, downstream of said working area, thus redefining of the empty seat in the same first test group of containers;

weighing, by said scale, the withdrawn filled container, in order to find out its gross weight, so as to determine the quantity of product introduced into the filled container, by difference between the corresponding values of tare and gross weight, which were found out by said scale.

BRIEF DESCRIPTION OF THE DRAWINGS

The characteristic features of the invention will be pointed out in the following description of some preferred, but not exclusive embodiments, with reference to the enclosed figures, in which:

FIGS. 1, 2 are schematic, lateral and top views of a filling machine carrying out a generic operation step of the method proposed by the invention;

Figure 9:
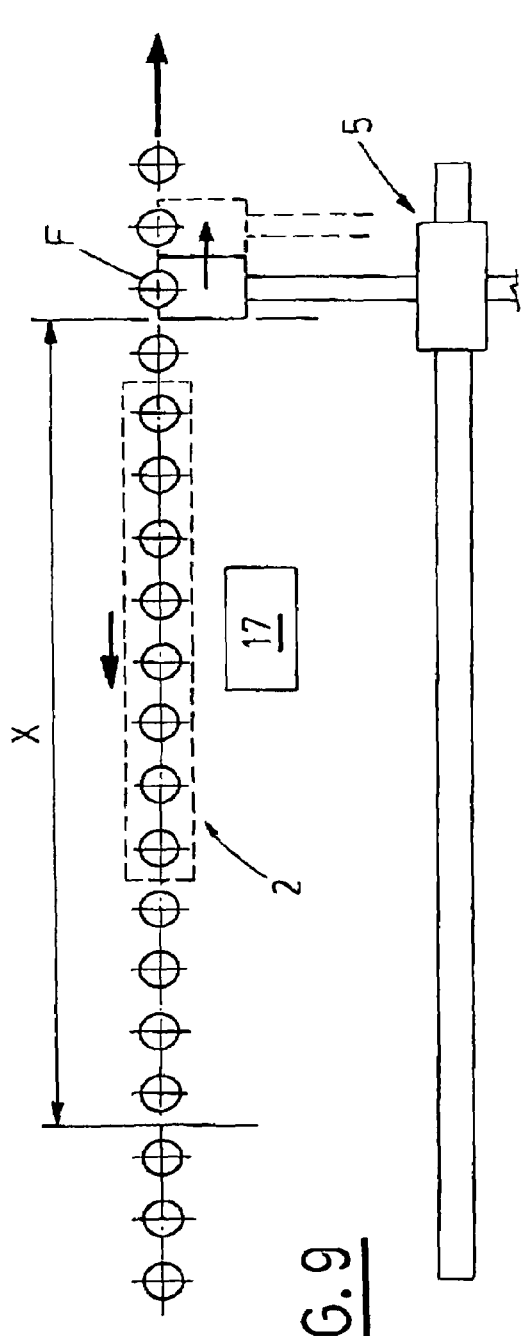

FIGS. from 3 to 12 are as many schematic, top views of the same filling line in subsequent operation steps of the proposed method, according to a preferred embodiment;

FIGS. 13, 14, 15A, 15B are schematic views of other modes of carrying out the operation steps shown in FIG. 6;

FIGS. from 16 to 21 are schematic, lateral views of the filling machine in subsequent operation steps of the proposed method, according to another mode of carrying out the method;

FIG. 22 is a schematic, top view of the filling machine while performing a generic operation step of the method proposed by the invention, according to a further mode of carrying it out.

DETAILED DESCRIPTION OD THE PREFERRED EMBODIMENTS

With regards to the above Figures, the general reference 1 indicates a line of a filling machine, moving in a forward direction Y, and receiving containers such as bottles and the like, in relative seats.

The product, for example a liquid and/or powder substance, is supplied by delivering means 2, having a plurality of nozzles $U_1$, $U_2$, $U_3$, $U_4$, $U_5$, $U_6$, $U_7$, $U_8$, e.g. eight, which match with the apertures of a group of containers in a working area X of the filling line 1 (FIGS. 1, 2).

For example, the support carrying the nozzles, the so-called "nozzle car", is operated so as to translate alternately, according to forward and backward strokes, respectively in the same and in opposed direction with respect to the forward direction Y of the filling line 1.

During the forward stroke, in the product delivery step, the nozzles $U_1$, . . . , $U_8$ mate the apertures of the containers moving with the same speed as the containers.

Figure 10:
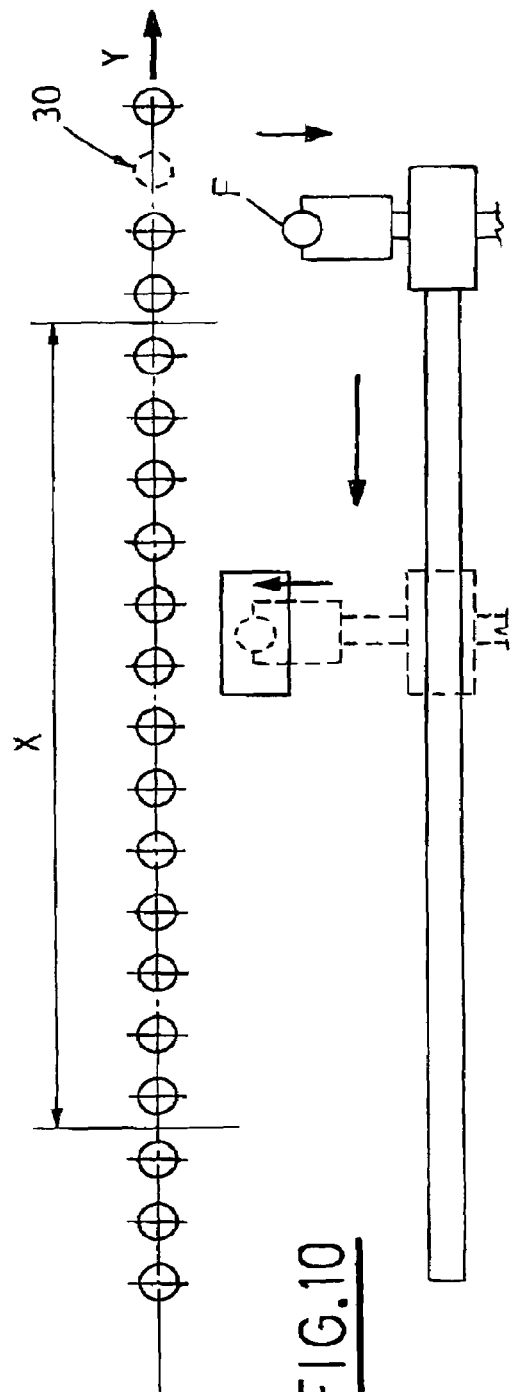

According to a preferred embodiment, the proposed method for statistical weighing of the product introduced into the containers, includes the following operation steps:

A) withdrawing an empty container F*, belonging to a first withdrawing group (FIG. 3), from the filling line 1, thus leaving therein an empty seat 3 (FIG. 4);

B) weighing the withdrawn empty container F*, by using a scale 17, in order to determine its tare (FIG. 4);

C) introducing the weighed empty container F* in the filling line 1, in an empty seat 30, made in a first test group and intended to match with a selected nozzle to be tested, e.g. the one indicated with $U_1$ (FIGS. 5, 6), in the working area X;

D) introducing of product into the weighed empty container F*, by the selected nozzle, up to a pre-established filling level (FIGS. 7, 8);

E) withdrawing of the filled container F from the filling line 1, downstream of the working area X, thus redefining the empty seat 30 in the same first test group (FIG. 10);

F) weighing, by the scale 17, the withdrawn filled container F, in order to determine its gross weight, thus determining the quantity of product introduced into the filled container F, by difference between the corresponding values of tare and gross weight, which were determined by the scale 17 (FIG. 10).

Afterwards, the filled and weighed container F can be rejected or introduced again on the filling line 1.

In the latter case, the proposed method includes a further step, in time relation with the weighing of the withdrawn and filled container F:

F1) introducing the filled and weighed container F into the filling line 1, downstream of the
working area X, in an empty seat 300, made in a first restore group (FIGS. 11, 12).

In this case, it is possible to operate in such a way, that the first restore group coincides with the first test group, that is that the respective empty seats 30, 300 coincide.

This is possible, if the withdrawing step and the subsequent weighing of the filled container F are fast enough, with respect to the filling line 1 forwarding speed, not to require the creation of an empty seat 300 in a first restore group, for introducing the filled container F in the filling line 1, since the empty seat 30 of the same test group would be used.

Likewise, it is possible to operate in such a way, that the first withdrawn group coincides with the first test group, that is that the respective empty seats 3, 30 coincide.

This is possible, if the withdrawing step and the subsequent weighing of the empty container F* are fast enough, with respect to the filling line 1 forward speed, not to require the creation of an empty seat 30 in a first test group, for introducing the empty container F* in the filling line 1, since the empty seat 3 of the same withdrawn group would be used.

If the first withdrawn group does not coincide with the first test group, it is necessary to deactivate temporarily, in step relation with the withdrawing of the empty container F*, belonging to the first withdrawn group, the nozzle matching with the empty seat 3, when the first withdrawn group passes through with the working area X.

The withdrawing of the empty container F* from the filling line 1 can advantageously take place upstream of the working area X.

Likewise, the weighed empty container F* can be introduced into the empty seat 30 made in the first test group (coinciding or not with the empty seat 3 of the first withdrawn group), indifferently upstream of the working area X, or in a zone corresponding thereto.

FIGS. 13, 14 show as many steps of introduction of the empty, weighed container $F_2$*, $F_3$*, into the relative empty seats 30 made in the first test group and aimed at matching, in the working area X, with the nozzles indicated correspondingly with $U_2$, $U_3$.

Likewise, FIGS. 15A, 15B show as many subsequent steps of introduction of the same empty, weighed container $F_8$*, during the backward stroke of the nozzles car, into an empty seat 30 made in the first test group and aimed at matching with the nozzle indicated with reference $U_8$, in the working area X.

According to another embodiment, the proposed method includes the following operation steps, performed in time relation with the weighing of the withdrawn filled container F, by the scale 17:

F2) positioning the filled and weighed container F in a waiting station 19, situated e.g. near the scale 17 (FIG. 16);

F3) withdrawing an empty container F*, belonging to a second withdrawing group, from the filling line 1, so as to define an empty seat 3 in the latter (FIG. 17);

F4) weighing of the withdrawn container F*, by the scale 17, in order to find out its tare (FIG. 18);

F5) transferring the above mentioned filled and weighed container F from the waiting station 19 to the filling line 1, to the empty seat 3 defined in the second withdrawing group, downstream of the working area X (FIGS. 19, 20, 21);

F6) introducing the empty, weighed container F*, into the filling line 1, to an empty seat 30 defined in a second test group, and aimed at facing a selected nozzle to be tested (FIGS. 5, 6);

F7) introducing the product into the empty, weighed container F*, by the selected nozzle, up to a pre established filling level (FIGS. 7, 8);

F8) withdrawing of the filled container F from the filling line 1, downstream of the working area X (FIG. 9), with re-defining of the empty seat 30 of the same first test group (FIG. 10);

F9) weighing of the withdrawn filled container F, by the scale 17, in order to find out its gross weight, so that the quantity of product introduced into the filled container F can be determined by the difference between the corresponding values of the gross weight and the tare; the latter having been found out by the scale 17 (FIG. 10).

Also in this case, it is necessary to deactivate temporarily the nozzle which matches the empty seat 3, when the second withdrawn group passes across the working area X.

As indicated previously, the empty, weighed container F* can be introduced in the empty seat 30, made in the second test group, indifferently upstream of, or in the working area X.

The empty container F* or filled container F is withdrawn/introduced from/into filling line 1 by a two-axis manipulating member 5, capable of cooperating with the scale 17.

Otherwise, the same operations can be performed by a plurality of two-axis manipulating members 5.

In particular, with reference to FIG. 22, a pair of manipulating members can be used, a first manipulating member 5 and a second manipulating member 50.

For example, the first manipulating member 5 withdraws the empty containers F* from the filling line 1, and reintroduces them after weighing, and the second manipulating member 50 withdraws the filled containers F from the filling line 1, allowing their reintroduction after the weighing.

In order to check the correct product delivery by each nozzle, the operation steps of the proposed method, according to the described embodiments, are advantageously performed for each nozzle of the delivery means 2.

In order to check the correct product delivery by each nozzle in long time, a plurality of statistical weighing cycles is performed, at prefixed time intervals.

The method proposed by the invention can be applied to any filling line 1, operated anyhow, that is either continuously or stepwise.

It results obvious from the above description that the proposed method for statistical weighing of the product introduced into containers and similar, in a filling line, allows a reduction of the handling, installation and maintenance costs, allowing at the same time to obtain a high weighing precision, substantially due to the use of only one scale and a limited number of manipulating members.

It is to be pointed out that the operation steps of the proposed method are extremely rapid and intuitive, which allows to achieve high functionality and reliability standards in any production step of the filling machine.

It is understood that the proposed invention has been described, with reference to the enclosed figures, as a mere, not limiting example. Therefore, it is obvious that any changes or variants applied thereto remain within the protective scope defined by the following claims.

What is claimed is:

1. A method for statistical weighing of a product introduced into containers in a filling line of a filling machine, said filling line moving in a forward direction and receiving said containers in seats; said product being supplied by delivery means consisting of a plurality of nozzles, matching with apertures of a group of containers moving through a working area of said filling line; the method including the following operation steps:

F) withdrawing an empty container, belonging to a first withdrawing group, from the filling line, to define an empty seat in said first withdrawing group;

G) transferring the empty withdrawn container onto a scale located adjacent to the working area of the filling line, weighing said withdrawn empty container, by means of said scale, to determine a tare weight of said empty container;

H) withdrawing the empty weighed container from the scale and introducing the weighed empty container back into said filling line, in an empty seat, made in a first test group of containers, the empty seat matching with a selected nozzle to be tested, in said working area;

I) moving the first test group of containers into the working area and introducing product into the weighed empty container, by means of said selected nozzle, up to a pre-established filling level;

J) withdrawing the filled container from said filling line, downstream of said working area, thus redefining the empty seat in the first test group of containers;

K) transferring the filled container onto the scale and weighing, by said scale, the withdrawn filled container, to determine a gross weight thereof, so as to determine the quantity of product introduced into the filled container, by determining the difference between the corresponding values of tare and gross weight, which were obtained from the same scale.

2. The method of claim 1, further including, in time relation with the weighing of the withdrawn filled container, by said scale;

F1) introducing the filled and weighed container into the filling line, downstream of said working area, in an empty seat, made in a first restore group.

3. The method of claim 2, wherein said first restore group coincides with said first test group.

4. The method of claim 1, further including, in step relation with the weighing of the withdrawn filled container, by said scale:

F2) positioning the filled and weighed container in a waiting station;

F3) withdrawing an empty container, belonging to a second withdrawn group, from the filling line, so as to leave therein an empty seat;

F4) weighing of said withdrawn container, by said scale, in order to determine its tare;

F5) transferring said filled and weighed container from the waiting station to the filling line, to the empty seat defined in said second withdrawn group, downstream of said working area;

F6) introducing said empty, weighed container, into the filling line, to an empty seat defined in a second test group, designed to match with a selected nozzle to be tested;

F7) introducing product into the empty, weighed container, by the selected nozzle, up to a pre-established filling level;

F8) withdrawing said filled container from the filling line downstream of said working area, redefining said empty seat of the same first test group;

F9) weighing the withdrawn filled container, by the scale, to determine a gross weight thereof, so as to determine the quantity of product introduced into the filled container, by determining the difference between the corresponding values of tare and gross weight, which were obtained from the same scale.

5. The method of claim 4, wherein said waiting station is situated near the scale.

6. The method of claim 4, further including, in time relation with withdrawing of an empty container, belonging to a second withdrawing group, temporary deactivation of the nozzle matching with said empty seat, when the second withdrawing group passes through said working area.

7. The method of claim 4, further including introduction of the empty, weighed container, into the empty seat, made in said second testing group, upstream of the working area.

8. The method of claim 4, further including introduction of the empty, weighed container, into the empty seat made ion said second test group, in the working area.

9. The method of claim 1, further including withdrawing of an empty container from the filling line being performed upstream of the working area.

10. The method of claim 1, wherein said first withdrawn group coincides with said first test group.

11. The method of claim 1, further including, in time relation with withdrawing of an empty container, belonging to a first withdrawn group, temporary deactivation of the nozzle designed to match with said empty seat, when the second withdrawing group passes through said working area.

12. The method of claim 1, further including introduction of the empty, weighed container, into the empty seat, made in said first test group, up stream of the working area.

13. The method of claim 1, further including introduction of the empty, weighed container, into the empty seat, made in said first test group, in the working area.

14. The method of claim 1, further including at least one manipulating member, cooperating with said scale, for withdrawing/introducing said empty container or filled container from/into said filling line.

15. The method of claim 1, further including a plurality of manipulating members, cooperating with said scale, for withdrawing/introducing said empty container or filled container from/into said filling line.

16. The method of claim 1, wherein said plurality of nozzles is operated so as to translate alternatively, according to forward and backward strokes, respectively in the same and in opposite direction with respect to the forward direction of said filling line.

17. The method of claim 1, wherein said operation steps are performed for each nozzle of said delivery means.

18. The method of claim 17, further including a plurality of statistical weighing cycles, at prefixed time intervals.

19. The method of claim 1, wherein said filling line is operated continuously.

20. The method of claim 1, wherein said filling line is operated stepwise.

* * * * *